2,458,521

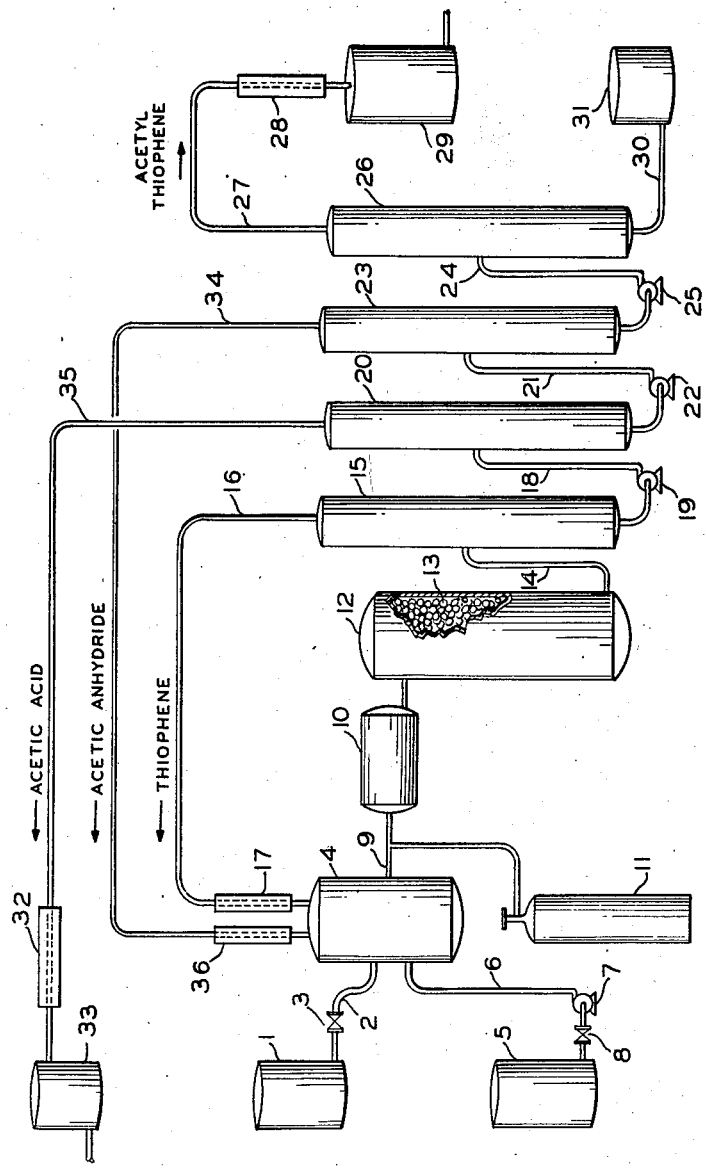
ALVIN I. KOSAK
HOWARD D. HARTOUGH
*INVENTORS*
BY *Raymond W. Barclay*
AGENT Patented Jan. 11, 1949

UNITED STATES PATENT OFFICE 2,458,521

ACYLATING THIOPHENE WITH SILICA-HYDROUS METALLIC OXIDE CATALYST

Alvin I. Kosak, Columbus, Ohio, and Howard D. Hartough, Pitman, N. J., assignors to Socony-Vacuum Oil Company, Incorporated, a corporation of New York Application January 4, 1946, Serial No. 639,142

20 Claims. (Cl. 260—329)

This invention relates to catalytic vapor-phase process for the acylation of thiophenes and, more particularly, is directed to a method for the continuous vapor-phase acylation of thiophene and its derivatives in the presence of a porous, absorptive catalyst comprising silica and a water-insoluble hydrous metallic oxide.

Acylation reactions, connoting the union between acyl radicals and molecules of organic compounds, are well known in the art. The compounds thus produced represent, structurally, the substitution of the original acyl radical on the organic compound molecule with the elimination of a hydrogen atom. The acyl radical may be furnished by various materials commonly referred to as acylating agents. Thus, organic acid anhydrides, acyl halides and acyl nitriles have served as sources of the acyl radical. In particular, acetyl chloride and acetic anhydride have found wide application as acylating agents.

The catalytic acylation of thiophene and derivatives thereof has heretofore been carried out in the presence of various catalysts including aluminum chloride, stannic chloride, titanium tetrachloride, phosphorus pentoxide and 2-chloromercurithiophene. Of these catalysts, those of the Friedel-Crafts type, such as aluminum chloride, stannic chloride and titanium tetrachloride, have been used most extensively. These catalysts, although applicable with considerable success in the acylation of aromatic hydrocarbons, are only moderately successful where thiophene is involved. This appears to be due to the relative instability of the thiophene ring; the Friedel-Crafts catalyst, for example, aluminum chloride, attacking the sulfur atom and causing many undesirable secondary products with concomitantly low yields of acyl thiophene.

Moreover, the above-mentioned catalysts, due to their relatively low boiling points and to the fact that sublimation or decomposition occurs at higher temperatures, must necessarily be confined to use in liquid phase acylation processes. Such processes, moreover, must be carried out as batch operations. With the increased use and demand in industry for acylated thiophenes, the need has arisen for a more efficient continuous process of manufacture.

The process of the present invention contemplates fulfillment of this need. In accordance therewith, it has been found that thiophenes may be continuously acylated in the vapor phase by the passage of thiophene or thiophene derivative and acylating agent at a temperature of between about 350° and about 550° F. over a porous absorptive catalyst comprising silica and a water-insoluble hydrous metallic oxide. It has been discovered that by using said catalyst, the process may be effectively carried out in a continuous manner in the vapor phase. Thus, a porous absorptive silica-alumina catalyst has been found to promote the acylation of thiophenes when the latter are present in the vapor phase. In addition to effecting a smooth, continuous acylation process, it has been found that by employing the above-mentioned catalyst, undue resinification and formation of addition complexes formerly encountered in the catalytic acylation of thiophene have been substantially eliminated, the products resulting being almost entirely acyl thiophenes having one or more side chains corresponding to that of the acylating agent.

It is, accordingly, an object of the present invention to provide a continuous vapor-phase process for synthesizing acylated thiophenes. Another object is to provide a continuous vapor-phase process for catalytically acylating thiophene and its derivatives. A still further object is to afford a continuous vapor-phase process for catalytically acylating thiophenes in a relatively simple and direct manner which can be easily carried out using an inexpensive, easily obtainable catalyst. A very important object is to provide a continuous vapor-phase process capable of reacting thiophene or its derivatives with an acylating agent in the presence of an efficient catalyst without undue formation of addition complexes between the catalyst and thiophene or between the catalyst and acylating agent.

These and other objects, which will be recognized by those skilled in the art, are attained in accordance with the present invention, wherein thiophene or its derivatives are acylated by reaction in the vapor phase with organic carboxylic acid anhydrides or acyl halides in the presence of a porous absorptive catalyst comprising silica and an insoluble hydrous metallic oxide.

Representative of the catalytic materials employed in the present invention are those comprising silica and at least one hydrous metallic oxide, such as zirconia, alumina, thoria, and the like. The catalyst may be either a natural clay, mineral, etc., or a synthetic composite of silica and one or more of the insoluble hydrous metallic oxides.

Naturally-occurring silica-alumina clays of the montmorillonite type which have been activated have been found to be effective catalysts for promoting the vapor-phase acylation of thiophenes. Typical of such products is the material sold under the trade name of Super Filtrol. Other clays contemplated for use in the present process include fuller's earth and Attapulgus clay, such as is commonly used for percolation of lubricating oils. In addition to the natural clays, synthetic silica-metallic oxide catalysts, such as those extensively employed in the cracking of petroleum hydrocarbons, may be used. These catalysts are synthetic, porous absorptive composites comprising silica and a metallic oxide, such as alumina, which may be formed in various ways, as, for example, precipitating silica on alumina, or alumina on silica, or by combining a silica gel with alumina, or by preparing a silica-alumina gel. The synthetic or naturally occurring silica-metallic oxide catalysts are employed in the process of this invention usually in the form of pellets or irregularly shaped pieces of a size corresponding to from about 6 to about 12 mesh.

The acylating agents to be used herein may be an organic carboxylic acid anhydride or an acyl halide. Included in the former category are compounds such as the ketenes, having the basic structural formula

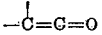

and which, upon addition of water, yield organic carboxylic acids. These acylating agents may be derived by methods well known to the art from organic acids which may be either unsaturated or saturated. Thus, representative acylating agents to be used in this invention include the anhydrides of saturated fatty acids, such as acetic anhydride, propionic anhydride, etc.; the acyl halides of saturated fatty acids, such as acetyl chloride; the anhydrides of unsaturated acids, such as crotonic anhydride; and the acyl halides of unsaturated acids, such as crotonyl chloride. These acylating agents are given merely by way of examples and are not to be construed as limiting, since other acyl halides or anhydrides of carboxylic acids, which will readily suggest themselves to those skilled in the art, may likewise be used.

Thiophene or derivatives of thiophene having one or more substituent groups, such as halogen, alkyl, aryl, or alkoxy groups attached to the thiophene ring, may be acylated in accordance with this invention. The 2- and 5-positions in the thiophene ring, being adjacent to the sulfur atom, are generally much more reactive than the 3- and 4-positions and, in acylating thiophene, the entering acyl group will preferably attach itself to the carbon atom adjacent to the sulfur. When the 2-position of the thiophene ring is already occupied by a substituent group or atom, the entering acyl group will preferably attach itself to the 5-position. When the 3-position is occupied, the acyl substituent will enter for the most part at the 2-position. However, in some instances, a small portion of the 3,5-product may be obtained. Thiophene derivatives having substituents of a highly negative character, such as carbonyl, carboxylic ester, nitro and cyano groups, and no activating substituent, such as a hydroxy or alkoxy group, do not acylate readily. These groups, commonly referred to as meta-directing, possess a highly electronegative character which tends to inhibit the acylation reaction.

The acylation of thiophene or its derivatives may be carried out employing equimolar quantities of thiophene and acylating agent. The exact proportions of the reactant used, however, are not critical, since an excess of either thiophene or acylating agent does not appear, as will be shown below, to produce higher conversions to ketone.

The temperature of operation may vary between about 350° F. and 550° F. and preferably between about 400° F. and about 500° F. At temperatures lower than 350° F., the conversion to ketone is extremely small, while at temperatures above 550° F., excessive decomposition occurs. The pressure during operation will generally be in the range of atmospheric or slightly higher. The reaction time will, in part, be dependent on the temperature and will generally be between about 1 and about 6 hours. The space velocity of vapor through the catalytic bed of porous, absorptive silica-metallic oxide material will generally be between about 25 and about 750 volumes of vapor per volume of catalyst per hour.

The catalyst used herein as indicated may be a natural clay of the montmorillonite type or a synthetic silica-alumina composite. Generally, clays which have been activated by acid treatment at elevated temperatures and which have a weight ratio of silica to alumina of not less than three to one and preferably from four to one, or higher, will be used. The amount of silica will usually vary from about 70 to 80 percent and the amount of alumina from 10 to 20 percent by weight of the clay. The remaining components comprising, particularly, ferric oxide, calcium oxide, and magnesium oxide, should comprise less than 10 percent of the clay. Typical of the activated clays which may be employed herein are those known to the art as Super Filtrol and Attapulgus clay.

Synthetic silica-alumina catalysts may be prepared in numerous ways well known to the art by the formation of gels or gelatinous precipitates comprising essentially silica and alumina. A representative method of preparing such synthetic catalysts is described in U. S. Patent 2,232,727 to Peterkin et al. Another effective synthetic catalyst was found to be spheroidal pellets of silica-alumina gel, prepared by mixing an acidic stream of aluminum sulphate and a stream of sodium silicate and allowing the resulting sol to be ejected from a nozzle into an oil column where the gel sets in the form of bead-like pellets. The resulting gel spheres, after washing, drying and tempering, proved to be efficient catalysts for the vapor-phase acylation of thiophene. The spheroidal pellets were also found to have the advantages of packing in the reaction tube in a uniform manner and of being relatively free from the breakage commonly encountered when irregularly shaped particles were employed. A further description of the method of preparing the above-described silica-alumina spheroidal pellets is disclosed in Patent No. 2,384,946, issued September 18, 1945, to Milton M. Marisic. The catalyst, whether a synthetic composite or a natural clay, should preferably have a particle size of from 6 to 12 mesh and is conveniently used in the form of ⅛ inch pellets.

After repeated use in the acylation process, the catalyst becomes deactivated, probably due to carbon deposition. The spent catalyst may be reactivated by burning off the carbon deposition at an elevated temperature for a period sufficient to restore its original activity. The original catalyst may hence be reused a considerable number of times before it degenerates completely and must be discarded.

Having described in a general way the nature of this invention, it may be more readily understood by reference to the attached drawing in which a flow diagram is shown for a process involving acetylation of thiophene with acetic anhydride. Those skilled in the art will understand that a system similar to that shown could likewise be employed, with minor alterations, when other carboxylic acid anhydrides or acyl halides are used as the acylating agent.

Referring more particularly to the drawing, thiophene is continuously conducted from storage tank 1 through conduit 2 to mixing chamber 4, the rate of flow being controlled by valve 3. In a similar manner, acetic anhydride is continuously led from storage tank 5 and forced through conduit 6 by pump 7, the flow rate being controlled by valve 8. The reactants, in the desired proportion, are thoroughly mixed in chamber 4 and then conducted through pipe 9 to preheater 10. An inert carrier gas, such as nitrogen, is fed under slight pressure into line 9 from tank 11. The mixture of thiophene and acetic anhydride vapors resulting from treatment in the preheater then passes to reactor 12 suitably packed with silica-metallic oxide catalyst 13. The reaction product mixture of acetyl thiophene, acetic acid, excess acetic anhydride and excess thiophene passes from the lower portion of the reactor through conduit 14 to fractionating tower 15. Thiophene, being the lowest boiling component of the mixture, is removed as vapor from the upper portion of the tower through pipe 16, passes through condenser 17 and enters the mixing chamber 4 as a liquid, where it serves to augment the supply of thiophene being conducted from tank 1.

The remaining components of the reaction mixture, namely, acetic acid, acetic anhydride and acetyl thiophene, condense in the bottom of tower 15. They are conducted therefrom and forced through conduit 18 by pump 19 to a second fractionating tower 20, where acetic acid is removed as vapor from the top of the tower passing through pipe 35 and condenser 32 to storage tank 33.

The condensed mixture of acetyl thiophene and acetic anhydride are removed from the bottom of tower 20 and forced through conduit 21 by pump 22 to a third fractionating tower 23. Acetic anhydride is there removed as a vapor, passing through pipe 34 and condenser 36, to mixing chamber 4, where it serves to augment the supply of acetic anhydride being conducted from tank 5.

Crude acetyl thiophene passes from the bottom of tower 23 and is forced through conduit 24 by pump 25 to fractionator 26, where it is distilled under reduced pressure. Acetyl thiophene vapor passes from the top of 26 through pipe 27 and is condensed upon passing through condenser 28 and enters storage tank 29 as a liquid. A small amount of resinous tar accumulating in the bottom of fractionator 26 is removed at intervals through pipe 30 and is collected in receiver 31.

The following detailed examples are for the purpose of illustrating modes of effecting the acylation of thiophene in accordance with the process of this invention. It is to be clearly understood that the invention is not to be considered as limited to the specific acylating agents disclosed hereinafter or to the specific conditions set forth in examples.

*Example 1*

A mixture of 1 mole of thiophene and 1 mole of acetic anhydride was introduced from a mixing vessel and slowly added to a reactor which contained about 400 milliliters of porous synthetic silica-alumina catalyst in the form of small pellets. The reactor was maintained at an average temperature of approximately 450° F. and addition of the reactant mixture took place over 4.4 hours. A slight pressure was maintained in the reactor by the introduction of nitrogen gas. Vapors leaving the reactor were condensed and 104 grams of a liquid product were obtained. This product, upon distillation, gave 29 grams of 2-acetylthiophene, which represented a conversion to ketone of 23 percent.

*Example 2*

An equimolar mixture of thiophene and acetic anhydride was passed through the reactor containing the same catalyst as used in Example 1 without intermediate regeneration. The average temperature was about 450° F. and addition of the reactant mixture took place over 4.7 hours. Upon condensation of vapor leaving the reactor, 131 grams of a liquid product were obtained. This product, upon distillation, gave 14 grams of 2-acetylthiophene, representing a conversion of 11 percent.

*Example 3*

An equimolar mixture of thiophene and acetic anhydride was passed through the reactor containing the same catalyst used in Examples 1 and 2 without intermediate regeneration. The average temperature was about 450° F. and addition of the reactant mixture took place over 5.25 hours. Upon condensation of vapor leaving the reactor, 136 grams of a liquid product were obtained. This product, upon distillation, gave 8.5 grams of 2-acetylthiophene, representing a conversion of 7 percent.

*Example 4*

An equimolar mixture of thiophene and acetic anhydride was passed through the reactor containing the same catalyst used in Examples 1, 2, and 3 without intermediate regeneration. The average temperature was about 450° F. and addition of the reactant mixture took place over 4.5 hours. Upon condensation of vapor leaving the reactor, 150 grams of a liquid product were obtained. This product, upon distillation, gave 7 grams of 2-acetylthiophene, representing a conversion of 6 percent.

*Example 5*

A mixture of 1 mole of thiophene and 1 mole of 95% acetic anhydride was passed through a reactor which contained about 200 milliliters of Super Filtrol in pellet form. The reactor was maintained at an average temperature of 450° F. and addition of the reactant mixture took place over 3.5 hours. A slight pressure was maintained in the reactor by the introduction of nitrogen gas. Upon condensation of vapor leaving the reactor, 158.5 grams of a liquid product were obtained. This product, upon distillation, gave 13.5 grams of 2-acetylthiophene, representing a conversion of 11 percent.

*Example 6*

A mixture of 1 mole of thiophene and 1.4 moles of acetic anhydride was passed through the reactor containing the same catalyst used in Example 5 without intermediate regeneration. The average temperature was maintained at 350° F. and addition of the reactant mixture took place over 5.5 hours. Upon condensation of vapor leaving the reactor, 212 grams of a liquid product were obtained. This product, upon distillation, gave 6 grams of 2-acetylthiophene, representing a conversion of 5 percent.

*Example 7*

A mixture of 1 mole of thiophene and 1.4 moles of acetic anhydride was passed through a reactor containing about 200 milliliters of fresh Super Filtrol. The tube was maintained at about 500° F. and addition of the reactant mixture took place over 1.8 hours. Upon condensation of vapor leaving the reactor, 192.5 grams of a liquid product were obtained. This product, upon distillation, gave 13 grams of 2-acetylthiophene, representing a conversion of 10 percent.

*Example 8*

A mixture of 2 moles of thiophene and 1 mole of acetic anhydride was passed through a reactor containing about 200 milliliters of fresh Super Filtrol catalyst which, prior to addition of the reactants, had been saturated with an equimolar mixture of thiophene and acetic anhydride at the reaction temperature. The addition of the reactant mixture took place over 1.25 hours while the reactor was maintained at a temperature of about 450° F. Upon condensation of vapor leaving the reactor, 193 grams of a liquid product were obtained. This product, upon distillation, gave 20 grams of 2-acetylthiophene, representing a conversion of 16 percent.

*Example 9*

A mixture of 1 mole of thiophene and 2 moles of acetic anhydride was passed through a reactor containing fresh Super Filtrol catalyst which, prior to addition of the reactants, had been saturated with an equimolar mixture of thiophene and acetic anhydride at the reaction temperature. The addition of the reactant mixture took place over 1.6 hours while the reactor was maintained at a temperature of about 440° F. Upon condensation of vapor leaving the reactor, 262 grams of a liquid product were obtained. This product, upon distillation, gave 14 grams of 2-acetylthiophene, representing a conversion of 11 percent.

*Example 10*

A mixture of 1 mole of thiophene and 1 mole of 95% acetic anhydride was passed through a reactor containing fresh Super Filtrol catalyst which, prior to addition of the reactants, had been saturated with an equimolar mixture of thiophene and acetic anhydride at the reaction temperature. The addition of the reactant mixture took place over 1.5 hours while the reactor was maintained at a temperature of about 445° F. Upon condensation of vapor leaving the reactor, 153 grams of a liquid product were obtained. This product, upon distillation, gave 20.5 grams of 2-acetyl thiophene representing a conversion of 16 percent.

From the above examples, it will be apparent that porous absorptive silicia-alumina catalysts are effective in promoting the vapor-phase acylation of thiophene.

Likewise, the present invention contemplates the use of catalysts comprising silica and other insoluble hydrous metallic oxides, such as zirconia, thoria, and hematite, since conversions of the same order were obtained using these catalysts as those obtained with silica-alumina composites.

It will be seen from Examples 1-4 that the silica-alumina catalyst may be reused a number of times without intermediate regeneration. In Examples 8-10, slightly better yields of product were obtained by saturating the catalyst with liquid by passing through an equimolar mixture of thiophene and acetic anhydride at the reaction temperature before starting the addition of reactant materials.

Other porous materials, such as activated alumina, silica gel, and activated charcoal, were found to be ineffective as catalysts for the vapor-phase acylation of thiophene. Likewise, benzene, which is considered to be similar to thiophene in some respects, was not acylated by vapor-phase operation employing a silica-alumina catalyst. The porous absorptive catalyst as used herein thus appears to be limited to silica-hydrous metallic oxide composites, both synthetic and naturally occurring, and to promoting the acylation of thiophene or its derivatives. However, it is not intended that the invention should be confined to the above description except as defined hereinafter in the appended claims.

We claim:

1. A continuous vapor-phase process for nuclear acylation of thiophenes with an acylating agent selected from the group consisting of acyl halides and anhydrides of carboxylic acids, comprising passing a mixture of said thiophene and said acylating agent through a bed of porous, absorptive silica-hydrous metallic oxide catalyst maintained at a temperature sufficient to vaporize said mixture, condensing vapors ensuing from said bed and treating the resultant condensate to give an acylated thiophene.

2. A continuous vapor-phase process for nuclear acylation of thiophenes with an acylating agent selected from the group consisting of acyl halides and anhydrides of carboxylic acids, comprising passing a mixture of said thiophene and said acylating agent through a bed of porous, absorptive naturally-occurring silica-hydrous metallic oxide catalyst maintained at a temperature sufficient to vaporize said mixture, condensing vapors ensuing from said bed and treating the resultant condensate to give an acylated thiophene.

3. A continuous vapor-phase process for nuclear acylation of thiophenes with an acylating agent selected from the group consisting of acyl halides and anhydrides of carboxylic acids, comprising passing a mixture of said thiophene and said acylating agent through a bed of porous, absorptive synthetic silica-hydrous metallic oxide catalyst maintained at a temperature sufficient to vaporize said mixture, condensing vapors ensuing from said bed and treating the resultant condensate to give an acylated thiophene.

4. A continuous vapor-phase process for nuclear acylation of thiophenes with an acylating agent selected from the group consisting of acyl halides and anhydrides of carboxylic acids, comprising passing a mixture of said thiophene and said acylating agent through a bed of porous, absorptive silica-alumina catalyst maintained at a temperature sufficient to vaporize said mixture, condensing vapors ensuing from said bed and treating the resultant condensate to give an acylated thiophene.

5. A continuous vapor-phase process for nuclear acylation of thiophenes with an acylating agent selected from the group consisting of acyl halides and anhydrides of carboxylic acids, comprising passing a mixture of said thiophene and said acylating agent through a bed of porous, absorptive silica-zirconia catalyst maintained at a temperature sufficient to vaporize said mixture, condensing vapors ensuing from said bed and treating the resultant condensate to give an acylated thiophene.

6. A continuous vapor-phase process for nuclear acylation of thiophenes with an acylating agent selected from the group consisting of acyl halides and anhydrides of carboxylic acids, comprising passing a mixture of said thiophene and said acylating agent through a bed of porous, absorptive silica-thoria catalyst maintained at a temperature sufficient to vaporize said mixture, condensing vapors ensuing from said bed and treating the resultant condensate to give an acylated thiophene.

7. A continuous vapor-phase process for nuclear acylation of thiophenes with an acylating agent selected from the group consisting of acyl halides and anhydrides of carboxylic acids, comprising passing a mixture of said thiophene and said acylating agent through a bed of porous absorptive activated silica-alumina clay maintained at a temperature sufficient to vaporize said mixture, condensing vapors ensuing from said bed and treating the resultant condensate to give an acylated thiophene.

8. A continuous vapor-phase process for nuclear acylation of thiophenes with an acylating agent selected from the group consisting of acyl halides and anhydrides of carboxylic acids, comprising passing a mixture of said thiophene and said acylating agent through a bed of porous, absorptive synthetic silica-alumina composite maintained at a temperature sufficient to vaporize said mixture, condensing vapors ensuing from said bed and treating the resultant condensate to give an acylated thiophene.

9. A continuous vapor-phase process for nuclear acylation of thiophenes with an acylating agent selected from the group consisting of acyl halides and anhydrides of carboxylic acids, comprising passing a mixture of said thiophene and said acylating agent through a bed of porous, absorptive synthetic silica-hydrous metallic oxide composite maintained at a temperature sufficient to vaporize said mixture, condensing vapors ensuing from said bed and treating the resultant condensate to give an acylated thiophene.

10. A continuous vapor-phase process for nuclear acylation of thiophenes with an acylating agent selected from the group consisting of acyl halides and anhydrides of carboxylic acids, comprising passing a mixture of said thiophene and said acylating agent through a bed of porous absorptive silica-alumina catalyst maintained at a temperature of from about 350° F. to about 550° F., condensing vapors ensuing from said bed and distilling the resultant condensate to give an acylated thiophene.

11. A continuous vapor-phase process for nuclear acylation of thiophenes with an acylating agent selected from the group consisting of acyl halides and anhydrides of carboxylic acids, comprising passing a mixture of said thiophene and said acylating agent through a bed of porous absorptive activated silica-alumina clay maintained at a temperature of from about 350° F. to about 550° F., condensing vapors ensuing from said bed and distilling the resultant condensate to give an acylated thiophene.

12. A continuous vapor-phase process for nuclear acylation of thiophenes with an acylating agent selected from the group consisting of acyl halides and anhydrides of carboxylic acids, comprising passing a mixture of said thiophene and said acylating agent through a bed of porous, absorptive synthetic silica-alumina composite maintained at a temperature of from about 350° F. to about 550° F., condensing vapors ensuing from said bed and distilling the resultant condensate to give an acylated thiophene.

13. A continuous vapor-phase process for nuclear acylation of thiophenes with an acylating agent selected from the group consisting of acyl halides and anhydrides of carboxylic acids, comprising passing a mixture of said thiophene and said acylating agent through a bed of porous, absorptive silica-alumina catalyst maintained at a temperature of from about 400° F. to about 500° F., condensing vapors ensuing from said bed and distilling the resultant condensate to give an acylated thiophene.

14. A continuous vapor-phase process for nuclear acylation of thiophenes with an acylating agent selected from the group consisting of acyl halides and anhydrides of carboxylic acids, comprising passing a mixture of said thiophene and said acylating agent through a bed of porous, absorptive silica-alumina catalyst, having a silica-alumina ratio between about 3:1 and about 8:1 maintained at a temperature sufficient to vaporize said mixture, condensing vapors ensuing from said bed and distilling the resultant condensate to give an acylated thiophene.

15. A continuous papor-phase process for nuclear acylation of thiophenes with an acylating agent selected from the group consisting of acyl halides and anhydrides of carboxylic acids, comprising passing a mixture of said thiophene and said acylating agent through a bed of porous absorptive activated silica-alumina clay, having a silica-alumina ratio between about 3:1 and about 8:1 maintained at a temperature sufficient to vaporize said mixture, condensing vapors ensuing from said bed and distilling the resultant condensate to give an acylated thiophene.

16. A continuous vapor-phase process for nuclear acylation of thiophenes with an acylating agent selected from the group consisting of acyl halides and anhydrides of carboxylic acids, comprising passing a mixture of said thiophene and said acylating agent through a bed of porous, absorptive synthetic silica-alumina composite, having a silica-alumina ratio between about 3:1 and about 8:1 maintained at a temperature sufficient to vaporize said mixture, condensing vapors ensuing from said bed and distilling the resultant condensate to give an acylated thiophene.

17. A continuous vapor-phase process for nuclear acylation of thiophenes with an acylating agent selected from the group consisting of acyl halides and anhydrides of carboxylic acids, comprising adding a mixture of said thiophene and said acylating agent over a period of from about 1 to about 6 hours to a bed of porous, absorptive silica-alumina catalyst maintained at a temperature of from about 350° F. to about 550° F., condensing vapors ensuing from said bed and distilling the resultant condensate to give an acylated thiophene.

18. A continuous vapor-phase process for nuclear acylation of thiophenes with an acylating agent selected from the group consisting of acyl halides and anhydrides of carboxylic acids, comprising adding a mixture of said thiophene and said acylating agent over a period of from about 1 to about 6 hours to a bed of porous, absorptive activated silica-alumina clay maintained at a temperature of from about 350° F. to about 550° F., condensing vapors ensuing from said bed and distilling the resultant condensate to give an acylated thiophene.

19. A continuous vapor-phase process for nuclear acylation of thiophenes with an acylating agent selected from the group consisting of acyl halides and anhydrides of carboxylic acids, comprising adding a mixture of said thiophene and said acylating agent over a period of from about 1 to about 6 hours to a bed of porous absorptive synthetic silica-alumina composite maintained at a temperature of from about 350° F. to about 550° F., condensing vapors ensuing from said bed and distilling the resultant condensate to give an acylated thiophene.

20. A continuous vapor-phase process for making an acyl thiophene comprising mixing thiophene and a carboxylic acid anhydride, vaporizing the resultant mixture, passing the vaporized material through a bed of porous, absorptive silica-alumina catalyst, collecting the reaction product mixture ensuing from said bed, removing unreacted thiophene and carboxylic acid anhydride therefrom, recycling said unreacted materials to the original reaction mixture, and distilling the remaining reaction product to give an acyl thiophene.

ALVIN I. KOSAK.
HOWARD D. HARTOUGH.

REFERENCES CITED

The following references are of record in the file of this patent:

UNITED STATES PATENTS

| Number | Name | Date |
|---|---|---|
| 2,295,977 | Thomas | Sept. 15, 1942 |

OTHER REFERENCES

Calloway: Chem. Rev., 17, 376-7 (1935).